(12) United States Patent
White

(10) Patent No.: US 11,132,354 B2
(45) Date of Patent: Sep. 28, 2021

(54) MAINTAINING DATA CONSISTENCY BETWEEN TRANSACTIONAL AND NON-TRANSACTIONAL DATA STORES

(71) Applicant: salesforce.com, inc., San Francisco, CA (US)

(72) Inventor: Seth John White, San Francisco, CA (US)

(73) Assignee: salesforce.com, inc., San Francisco, CA (US)

(*) Notice: Subject to any disclaimer, the term of this patent is extended or adjusted under 35 U.S.C. 154(b) by 226 days.

(21) Appl. No.: 16/235,300

(22) Filed: Dec. 28, 2018

(65) Prior Publication Data

US 2019/0138514 A1  May 9, 2019

Related U.S. Application Data

(63) Continuation of application No. 14/670,363, filed on Mar. 26, 2015, now Pat. No. 10,169,396.

(60) Provisional application No. 61/971,169, filed on Mar. 27, 2014.

(51) Int. Cl.
  *G06F 16/20* (2019.01)
  *G06F 16/23* (2019.01)
  *G06F 16/11* (2019.01)
  *G06F 16/951* (2019.01)

(52) U.S. Cl.
  CPC ........ *G06F 16/2365* (2019.01); *G06F 16/113* (2019.01); *G06F 16/951* (2019.01)

(58) Field of Classification Search
  None
  See application file for complete search history.

(56) References Cited

U.S. PATENT DOCUMENTS 5,577,188 A   11/1996  Zhu
5,608,872 A    3/1997  Schwartz et al.
5,649,104 A    7/1997  Carleton et al.
(Continued)

OTHER PUBLICATIONS

Final Office Action for U.S. Appl. No. 14/670,363 dated May 22, 2018, 9 pages.
(Continued)

*Primary Examiner* — Belix M Ortiz Ditren
(74) *Attorney, Agent, or Firm* — Jaffery Watson Mendonsa & Hamilton LLP

(57) ABSTRACT

Embodiments regard maintaining data consistency between transactional and non-transactional data stores. Embodiments may include receiving a request to archive a set of data stored in a first data store, recording a high water mark in the first data store for the set of data, and archiving the set of data. Archiving the set of data may include copying the set of data into a second data store and inserting a high water mark for the set of data in the first data store and the second data store. Embodiments may further include updating a reference high water mark upon successful completion of operations for the archiving of the data, the reference high water mark representing completion of a last successful archive operation, and, upon receiving a query for requested data contained in the first or second data store, determining whether to allow viewing of the requested data based at least in part on a current value of the reference high water mark.

22 Claims, 9 Drawing Sheets

(56) References Cited

U.S. PATENT DOCUMENTS

| | | |
|---|---|---|
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,125,368 A * | 9/2000 | Bridge ................ G06F 11/1415 |
| 6,125,371 A * | 9/2000 | Bohannon ............ G06F 16/219 |
| | | 707/695 |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,577,689 B1 * | 8/2009 | Masinter ............ G06F 11/1464 |
| 7,620,655 B2 | 11/2009 | Larsson et al. |
| 7,912,834 B2 * | 3/2011 | Gupta ................ G06F 16/24539 |
| | | 707/717 |
| 8,935,492 B2 * | 1/2015 | Gokhale ............ G06F 11/1402 |
| | | 711/161 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0177744 A1 | 7/2009 | Marlow et al. |
| 2012/0270496 A1 | 10/2012 | Kuenzi et al. |

OTHER PUBLICATIONS

Non-Final Office Action for U.S. Appl. No. 14/670,363 dated Oct. 6, 2017, 8 pages.

Notice of Allowance for U.S. Appl. No. 14/670,363 dated Aug. 29, 2018, 13 pages.

* cited by examiner

Ref: HWM-1
205

| E0 | HWM-0 | Data-0 |
| E1 | HWM-1 | Data-1 |
| E2 | HWM-2 | Data-2 |
| E3 | [none] | Data-3 |

Transactional Data Store
210

Ref: HWM-1
215

| E0 | HWM-0 | Data-0 |
| E1 | HWM-1 | Data-1 |
| E2 | HWM-2 | Data-2 |
| | | |

Archive Data Store
220

FIG. 2

Ref: HWM-2
205

| E0 | HWM-0 | Data-0 |
|----|-------|--------|
| E1 | HWM-1 | Data-1 |
| E2 | HWM-2 | Data-2 |
| E3 | [none] | Data-3 |

Transactional Data Store
210

Ref: HWM-2
215

| E0 | HWM-0 | Data-0 |
|----|-------|--------|
| E1 | HWM-1 | Data-1 |
| E2 | HWM-2 | Data-2 |
|    |       |        |

Archive Data Store
220

FIG. 3

MAINTAINING DATA CONSISTENCY BETWEEN TRANSACTIONAL AND NON-TRANSACTIONAL DATA STORES

CROSS REFERENCE TO RELATED APPLICATIONS

This United States patent application is a continuation of U.S. patent application Ser. No. 14/670,363, filed Mar. 26, 2015, entitled "Maintaining Data Consistency Between Transactional and Non-Transactional Stores", and is related to and claims priority to U.S. Provisional Patent Application No. 61/971,169 filed Mar. 27, 2014, entitled "Maintaining Data Consistency Between Transactional and Non-Transactional Stores", the entire contents of which are incorporated herein by reference.

TECHNICAL FIELD

Embodiments relate to techniques for computer database operation. More particularly, embodiments relate to maintaining data consistency between transactional and non-transactional stores.

BACKGROUND

In a computer database system, data is commonly transferred from a transactional data store, where operations regarding the data occur, to an archive data store (or other non-transactional data store), where the data is stored on a long-term basis. In order to facilitate long-term data archiving, field history data is conventionally copied from its starting location (a transactional data store) to a long-term storage location (a non-transactional data store, or archive data store). After the data is successfully copied to the archive data store, the data will eventually be deleted at some later point in time from the transactional data store.

However, a transitional period occurs while data is being copied, deleted, and stored in both the transactional data store and the archive data store. During this transitional period, as customers query the transactional data store, the archive data store, or both they may view duplicate data, missing data, or incomplete data due to intermittent failures occurring during the archive and delete operations. Queries requesting views of data may occur at any time. Because of the nature of archiving operation, inconsistent views of data in the transactional store and the archive data store may occur if a query is presented during an archive operation.

BRIEF DESCRIPTION OF THE DRAWINGS

Embodiments are illustrated by way of example, and not by way of limitation, in the figures of the accompanying drawings in which like reference numerals refer to similar elements.

FIGS. 2 and 3 illustrate a transactional archiving system that includes a transactional data store and an archive data store according to an embodiment;

DETAILED DESCRIPTION

Figure 1:
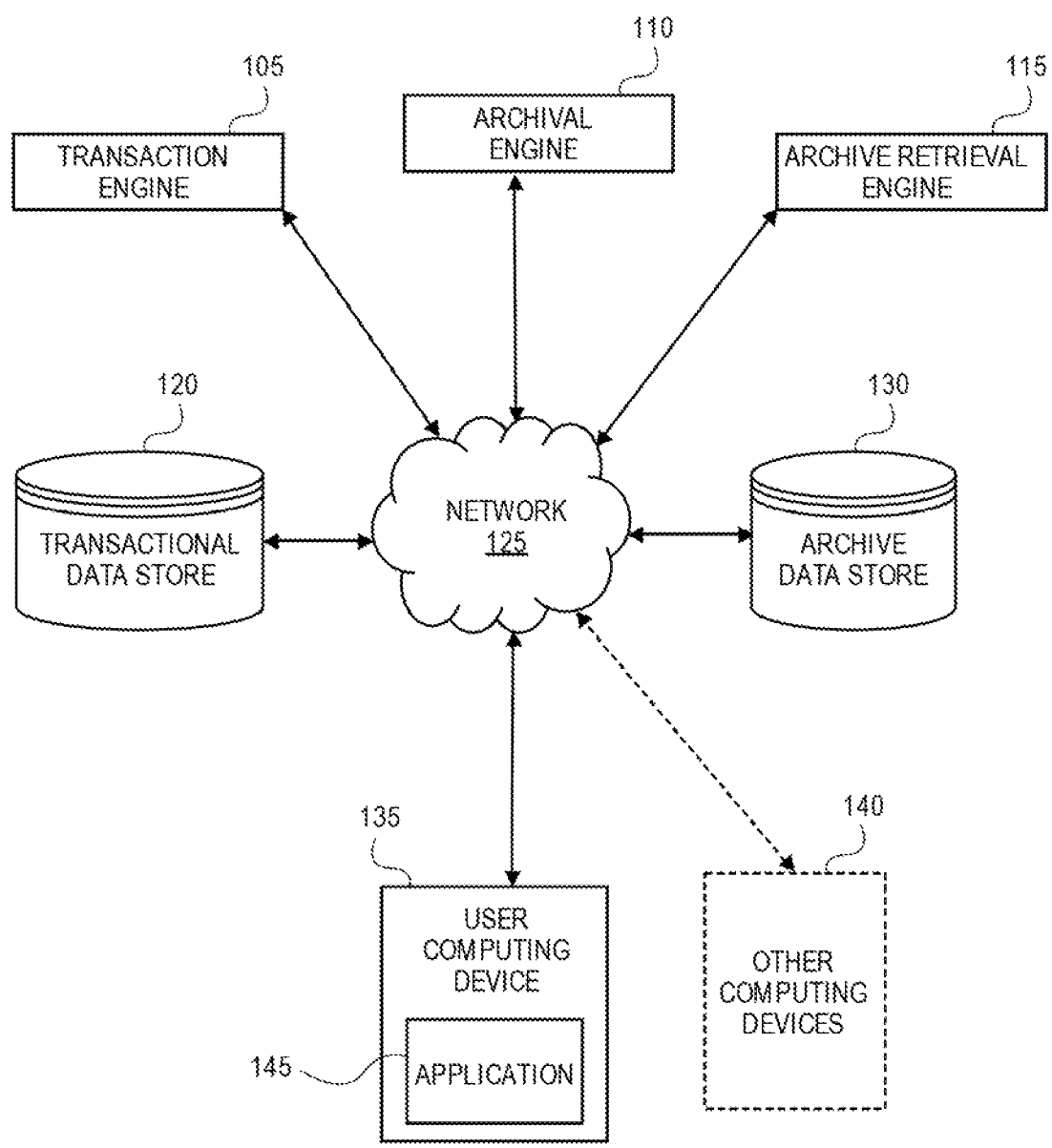
FIG. 1 illustrates a transactional archiving system according to an embodiment.

In the following description, numerous specific details are set forth. However, embodiments may be practiced without these specific details. In other instances, well-known circuits, structures and techniques have not been shown in detail in order not to obscure the understanding of this description. The following detailed description is made with reference to the figures, which illustrate aspects of the technology disclosed.

In some embodiments, an apparatus, system, or method operates to improve a user's viewing experience during archiving from a transactional data store to an archive data store by providing the user with a consistent view of data, with the view being from either the transactional data store or the archive data store. An apparatus, system, or method may also apply in an operation between different types of data stores, such as a copy operation from a first archive data store to a second archive data store. In general, such operation is referred to herein as an archiving (or archival) operation or process.

In some embodiments, a high water mark (HWM, which may also be referred to as a data high water mark) or other reference value is provided to a retrieval application server, the retrieval application server to apply the high water mark in qualifying queries made against both the archive data store and the transactional data store. In some embodiments, a reference high water mark (Ref HWM) represents a time, such as a time and date stamp, or order of a last successful archive operation, such as an accession sequence number.

For example, a reference high water mark may consist of a time and date at which successful archiving was last completed. Initially the reference high water mark is null (or has other initial value) because data has not yet been archived and remains stored at the transactional data store. Once an archive operation begins, the current value of the reference high water mark is compared to a high water mark for each data entry to determine data availability. In some embodiments, the reference high water mark and data high water marks are utilized to prevent customers from being able to view new data as the data is being copied into the archive system until the archive operation completes. In some embodiments, the reference high water mark is stored in the transactional data store, and may be specific to the type of data that is being archived. In data storage, data values may be ordered in a total ordering that can be different for different types of data. In some embodiments, the reference high water mark represents a value in a total ordering of archiving operations representing the last successful archiving operation.

In some embodiments, at the conclusion of an archiving operation, the reference high water mark is updated transactionally, which allows all new queries against the archive data store to immediately view the newly archived data values in real-time. At the same time, new queries made against the transactional data store are then prevented from seeing the successfully archived data in the transactional data store.

While the technology disclosed is disclosed by reference to the preferred embodiments and examples detailed above, it is to be understood that these examples are intended in an illustrative rather than in a limiting sense.

FIG. 1 illustrates a transactional archiving system according to an embodiment. As illustrated in FIG. 1, a system 100 includes a transactional data store (also referred to as a transaction store) 120 and an archive data store (also referred to as an archive store) 130, where the transactional data store includes a first set of one or more storage elements and the archive data store includes a second set of one or more storage elements, including storage elements in different locations, to store data elements. More generally, an archival operation is from a first data store (transactional data store 120) to a second data store (archive data store 130). Further, multiple users may access the system 100, including a user computing device 135 with user application 145, as well as other computing devices 140. The number of connecting users is potentially very large in a particular organization. In the system 100, the transactional data store 120 includes original data that has yet to be archived or copied to its new location, wherein the archived or copied location is or will be in the archive data store 130. Data transactions in the transactional data store may be implemented using transaction engine 105. The elements may be connected via one or more networks, such as network 125, which may include the Internet, an internal organization network, or other network structure.

In an operation, the transactional data store 120 receives a request via network 125 to begin an archival operation. In some embodiments, the archival process may be performed by archival engine 110, wherein the transaction engine 105 may be not be aware of the archival process. In response to the request to begin the archival operation, the archival engine 110 begins copying a set of data from the transactional data store 120 to the archive data store 130, where the copied data is saved and stored. Also illustrated is an archive retrieval engine 115 for retrieving data from the archive data store.

Queries may be allowed at any time, and thus may arrive before, during, or after archive operations. In some embodiments, if a query (such as a query from user computing device 135) requesting to view the data involved in the archiving process is directed to the transactional data store 120 prior to completion of any archiving process, such data is available for viewing. However, such data is not available at this time for viewing in the archive data store 130, which may include incorrect, duplicate, or missing data during the archiving process. In some embodiments, determination of whether data is available for viewing is based at least in part on the values of a reference high water mark, wherein the reference high water mark may represent a last successful archiving operation.

In some embodiments, at the conclusion of a successful archiving operation by archival engine 110, archive retrieval engine 115 records a new reference high water mark that is applied to the set of data stored in the transactional data store 120 and archive data store 130 with regard to queries received after the archiving operation. Stated in another way, a query that arrives before or during an archive operation is subject to the current reference high water mark that existed prior to the archiving operation, and a query that arrives after the successful completion of the archiving operation is subject to new reference high water mark that is recorded upon the successful completion of the archiving operation.

In some embodiments, based at least in part on the value of the reference high water mark, upon a request to view the data involved in the archiving operation in the archive data store 130, the archive data store 130 via the archive retrieval engine then displays the archived data to a viewer, where the displayed data is free of duplicate, missing, or corrupted values upon the completion of the archiving process. In some embodiments, based at least in part on the value of the reference high water mark, upon a request to view the data involved in the archive/copy operation in the transactional data store 120, the transactional data store 120 via the transaction engine excludes the archived data from view because such data has now been archived, and the data in the transactional data store 120 may be deleted at some point in time. The exclusion of data from view may include, but is not limited to, data hiding, such as illustrated in the form of query rewriting in FIG. 4.

FIGS. 2 and 3 illustrate a transactional archiving system that includes a transactional data store and an archive data store according to an embodiment. In FIGS. 2 and 3, the tables are provided for ease of illustration, and are not intended to show the actual form of data storage in the data stores.

In FIG. 2, a transactional data store 210 includes certain data that been archived and is annotated with a high water mark (HWM, which may also be referred to as a data high water mark) that is recorded in connection with the archiving of such data in addition to other data that is not yet scheduled to be archived and that does not include a HWM. For example, the transactional data store 210 at a certain first point in time includes four data elements: E0 containing data Data-0 having high water mark HWM-0; E1 containing data Data-I having high water mark HWM-1; E2 containing data Data-2 having high water mark HWM-2; and E3 containing data Data-3 having no high water mark. In FIGS. 2 and 3, a high water mark with a first number is earlier than a high water mark with a second number if the first number is less than the second number, such as HWM-1 is prior to HWM-2. At a point in time, a reference high water mark 205 for the transactional data store and a reference high water mark 215 for the archive data store 220 indicate a last complete archival, which is indicated as HWM-1 at a certain point in time illustrated in FIG. 2.

Also illustrated in FIG. 2 is an archive data store 220 including data elements: E0 containing data Data-0 having high water mark HWM-0; E1 containing data Data-I having high water mark HWM-1; and E2 containing data Data-2 having high water mark HWM-2.

In some embodiments, access to the data contained in the transactional data store 210 and archive data store 220 is based at least in part on the respective reference high water marks (RefHWMs) 205 and 215. In FIG. 2, within the transactional data store 210, elements E0 with high water mark HWM-0 and E1 with high water mark HWM-1 are not viewable (illustrated by cross-hatching of the entries) because the high water mark of such items is less than or equal to the reference high water mark 205, thus indicating that the data, Data-0 and Data-I in this example, has been successfully archived. Elements E0 and E1 may eventually be deleted. Further, data elements E2 and E3 are viewable because the high water mark for each is not less than or equal to the reference high water mark 205, E2 having a later high water mark and E3 not have a high water mark at this point, thus indicating that data element E3 has not yet been scheduled for archival.

Further in FIG. 2, within the archive data store 220, elements E0 with high water mark HWM-0 and E1 with high water mark HWM-1 are viewable because the high water mark of each of such items is less than or equal to the reference high water mark 215, thus indicating that the data, Data-0 and Data-I in this example, has been successfully archived. However, data element E2 is excluded from viewing because the high water mark for E2, HWM-2, is not less than or equal to the reference high water mark 215, HWM-1, indicating that such data has not yet been successfully archived.

In FIG. 3, the transactional data store 210 and archive data store 220 are shown at a second, later point in time. As illustrated, the archiving of the E2 data has been completed, and the reference high water mark 205 that is recorded for the transactional data store 210 and the reference high water mark 215 for the archive data store 220 are updated to HWM-2. In FIG. 3, within the transactional data store 210, elements E0 with high water mark HWM-0, E1 with high water mark HWM-1, E2 with high water mark HWM-2 are not viewable because the high water mark of such items is less than or equal to the reference high water mark 205, HWM-2, thus indicating that the data has been successfully archived. Further, data element E3 remains viewable because the high water mark for E3 is not less than or equal to the reference high water mark 205, E3 not have a high water mark at this point, thus indicating that such data element has not yet been schedule for archival.

Further in FIG. 3, within the archive data store 220, elements E0 with high water mark HWM-0, E1 with high water mark HWM-1, and E2 with high water mark HWM-2 are now viewable because the high water mark of each of such items is less than or equal to the reference high water mark 215, HWM-2, thus indicating that the respective data has been successfully archived.

In some embodiments, the application of the reference high water mark against the transactional data store and archive data store provides that:

(a) Because queries against the transactional data store are not allowed to see data values that precede the reference high water mark, these data values may be deleted in an asynchronous fashion and failures during the delete process will not be visible to customer queries.

(b) Duplicate data values are not visible between the transactional data store and the archive data store because the reference high water mark ensures that the respective entry in the archive data store is excluded prior to successful archival of data, and that the respective entry in the transactional data store is excluded on and after the successful archival of data.

(c) Because queries against the archive data store are not allowed to see new data values until the archive process completes, such queries are shielded from failures during the archive process, the archive data store only being available for view when the complete and correct data has been archived.

In some embodiments, data hiding may be utilized to exclude certain data elements from viewing. In some embodiments, data hiding is implemented by query rewriting. However, embodiments are not limited to a particular operation such as query rewriting, and data hiding may be implemented in a different fashion.

Figure 4:
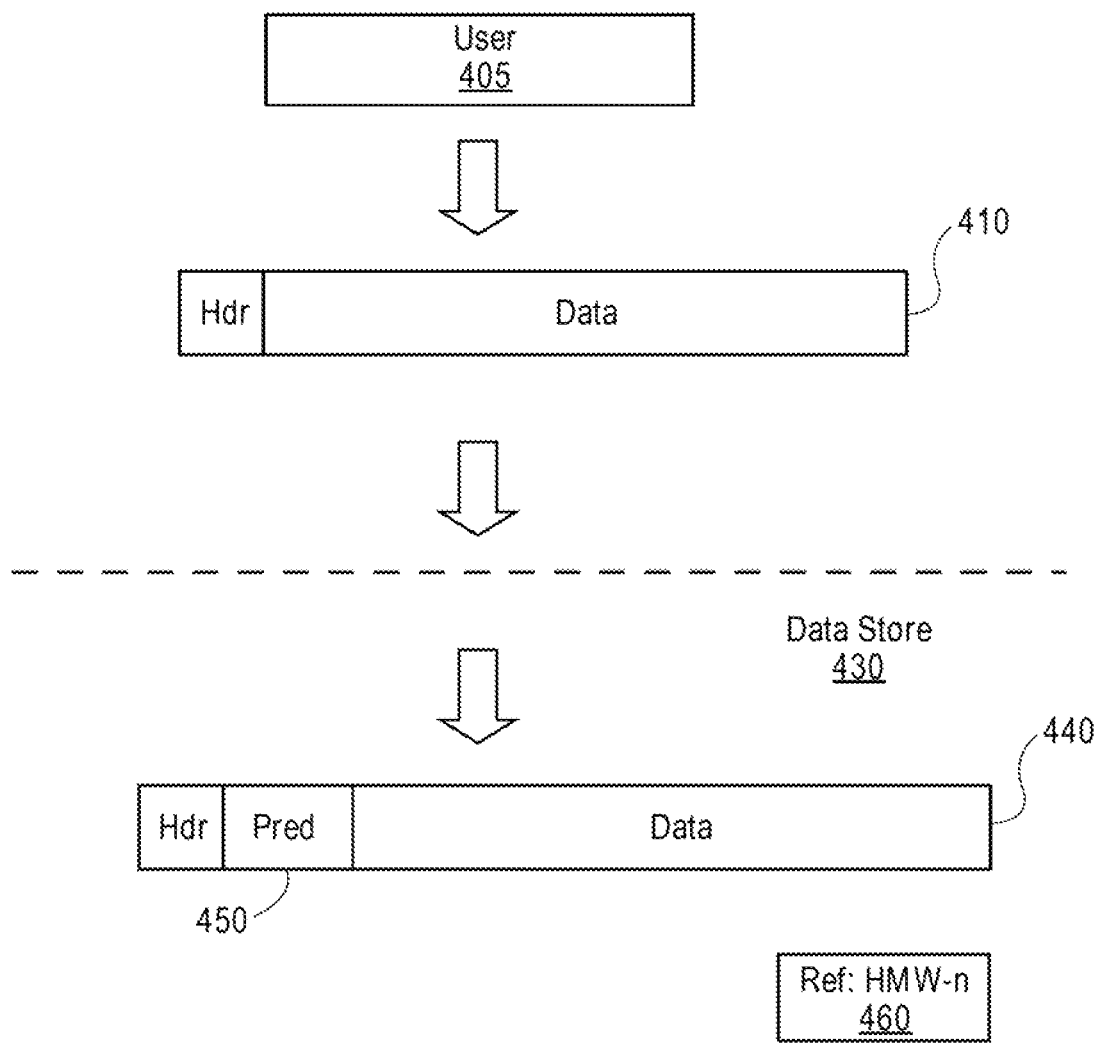
FIG. 4 is an illustration of query rewriting to implement data hiding according to an embodiment.

FIG. 4 is an illustration of query rewriting to implement data hiding according to an embodiment. In some embodiments, a query requesting viewing of data in a transactional data store or archive data store is rewritten to enable a consistent view of data in each data store.

As illustrated in FIG. 4, upon a user (such as user computing device 135 illustrated in FIG. 1) may provide a query in a system directed to either a transactional data store (a first data store) or an archive data store (a second data store). As data stored in the transactional data store is to be archived in the archive data store, a request may occur before an archiving operation commences, during an archiving operation, or after a successful archiving operation is completed.

In a simplified illustration, the query command 410 may include, but is not limited to, one or more headers (Hdr) and data to describe the query. In one implementation, upon the query command 410 being directed to a data store 430, the query command 410 is rewritten as query command 440 to implement data viewing protection. In some embodiments, the rewriting of the query command including adding an additional predicate 450 or other field to each query command submitted against the transactional data store and the archive data store, wherein the predicate or other field references the current value of the reference high water mark 460, shown as HWM-n.

In some embodiments, rewritten query commands 440 submitted against the transactional data store are thereby qualified to omit archived data, as indicated by comparing the reference high water mark to high water mark values stored in individual records of the transactional data store. Further, query commands 440 submitted against the archive data store are qualified to omit data that has not been successfully archived, as indicated by comparing the reference high water mark to high water marks stored in individual records of the archive data store.

Figure 5:
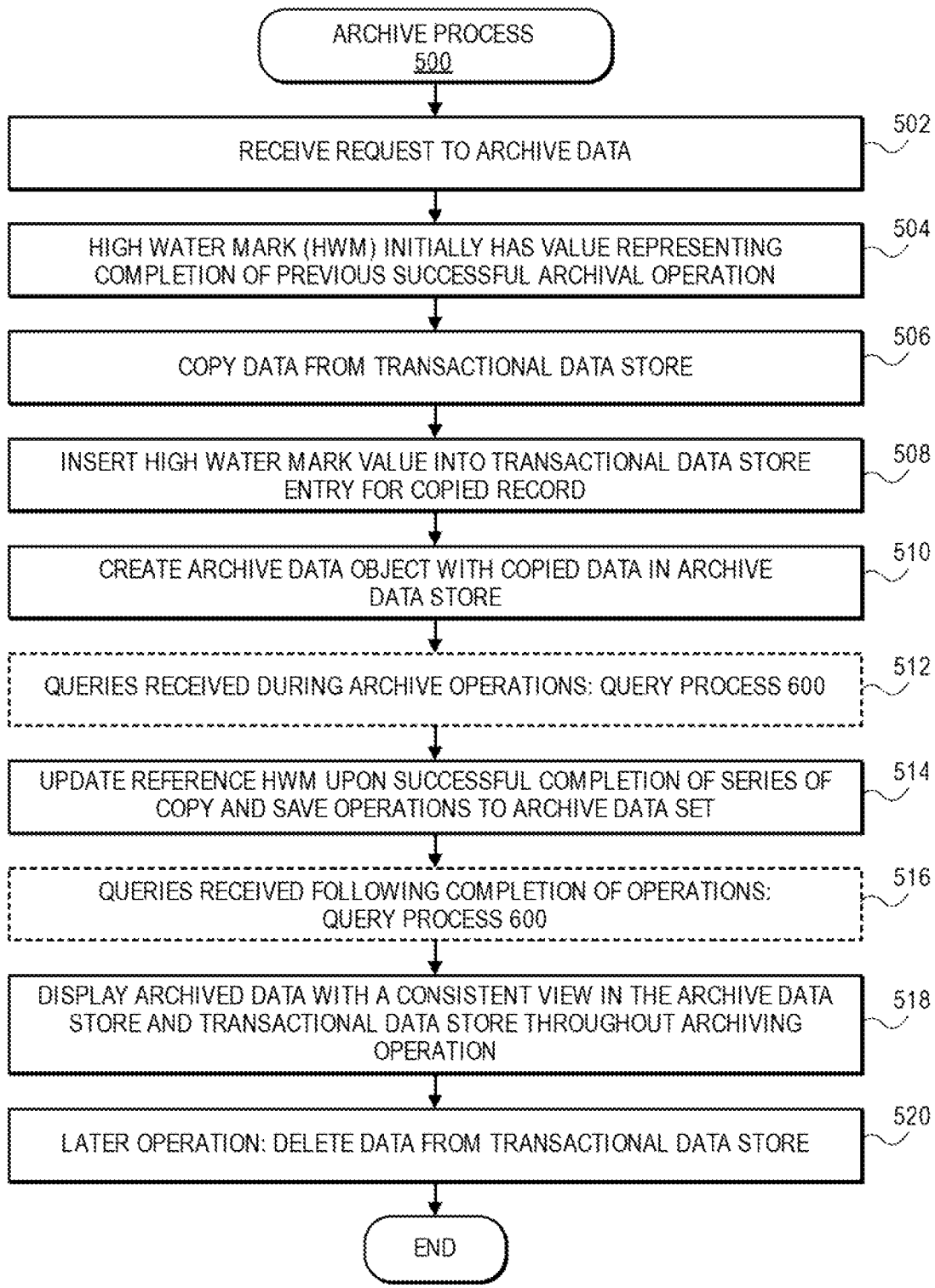
FIG. 5 is a flow chart to illustrate a process of archiving data for long-term storage in which a consistent data view is maintained according to an embodiment.
Figure 6:
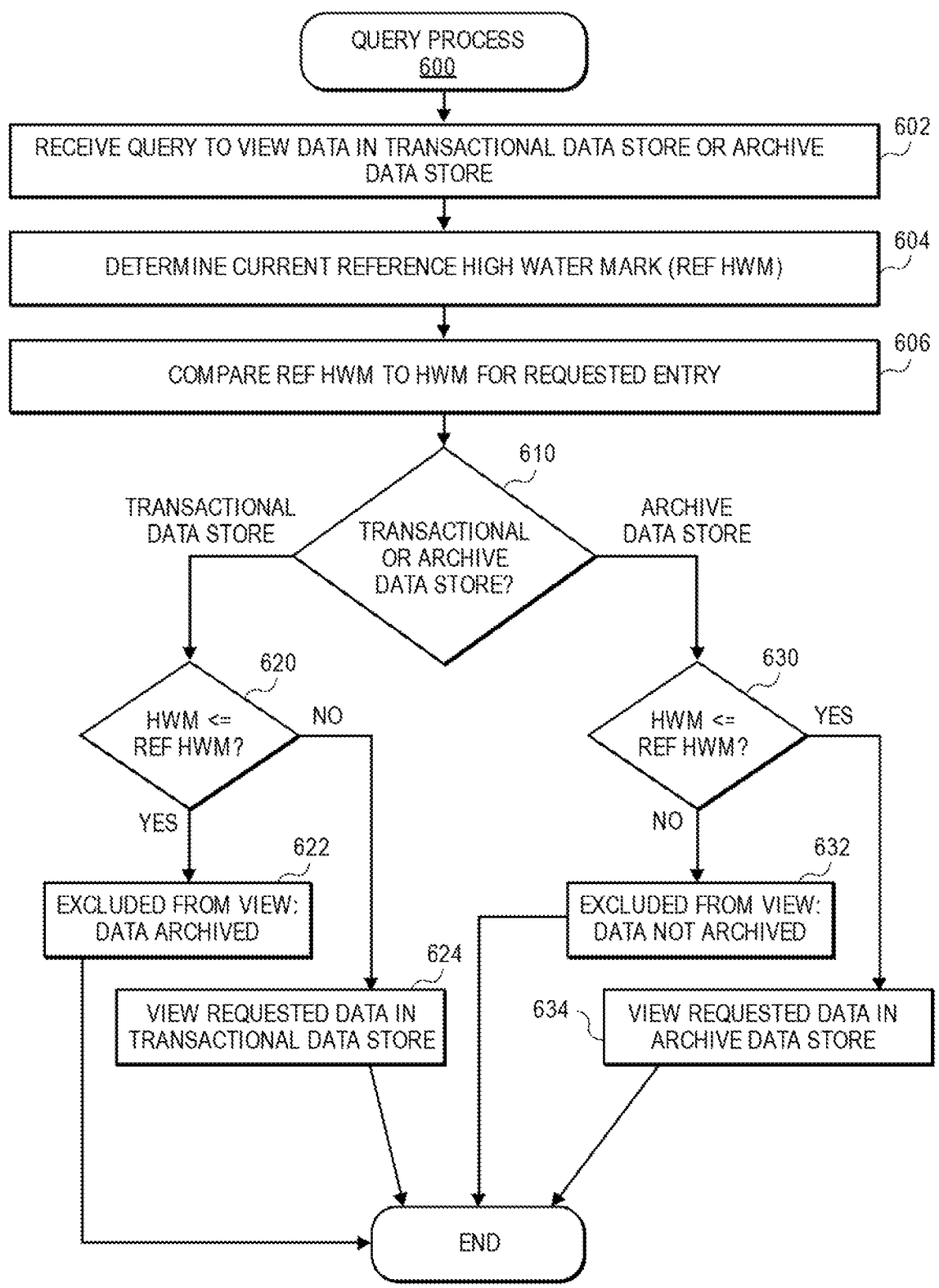
FIG. 6 is a flow chart to illustrate a process for handling queries in a transactional archiving system according to an embodiment.

FIG. 5 is a flow chart to illustrate a process of archiving data for long-term storage in which a consistent data view is maintained according to an embodiment. It is noted that other implementations may perform processes in different orders and or with fewer or additional elements than the ones illustrated in FIGS. 5 and 6. Multiple processes can be combined in some implementations. For convenience, the flowcharts of FIGS. 5 and 6 are described with reference to a system that carries out a method. However, the system is not necessarily part of the method illustrated in such figures.

As provided in archive process 500 illustrated in FIG. 5, in some embodiments, a transactional data store receives a request to archive a set of data 502. A reference high water mark initially has a value representing a time or order of completion of a prior successful archival operation 504. The set of data is copied from the transactional data store 506, and a high water mark value is inserted into the transactional data store version of the copied record 508.

In some embodiments, an archive object is created using the copied set of data and the data is stored in the archive data store 510. Queries may be allowed at any time, and thus may arrive before, during, or after archival operations. A query against the transactional data store or archive data store may occur during the archival operation (or at any other time) 512, wherein the query may be handled as illustrated in FIG. 6. In some embodiments, the reference high water mark is updated upon successful completion of completing a series of copy and save operations to archive the data set 514. As illustrated, there may also be queries against the transactional data store or archive data store following successful completion of the archiving operation 516, wherein the query handling may be addressed as illustrated in FIG. 6.

In some embodiments, the archived data is displayed with a consistent view queries against the transactional data store and the archive data store throughout the archiving process

518. Prior to completion of the archiving operation, the requested data may be viewed from the transactional data store, thus avoiding any view of data problems occurring during archiving. After successful archival, the archived data is displayed in the archive data store, the archived data being free from duplicate, missing, or corrupted values. The successfully copied data may later be deleted from the transactional data store 520.

FIG. 6 is a flow chart to illustrate a process for handling queries in a transactional archiving system according to an embodiment. A query process 600 includes receiving a query to view certain data in a transactional data store or an archive data store 602. Queries may be allowed at any time, and thus may arrive before, during, or after archival operations. In some embodiments, a determination is made regarding a current reference high water mark (Ref HWM) 604, wherein the reference high water mark represents a time or order of a last successful archive process. In some embodiments, the reference high water mark is compared with the high water mark in an entry for the requested data 606.

For a request directed to a transactional data store 610, if the high water mark of the entry for the requested data is less than or equal to the current reference high water mark 620, indicating that the data has been successfully archived, then the data is excluded from view 622. Otherwise, the requested data in the transactional data store may be viewed 624.

For a request directed to an archive data store 610, if the high water mark of the entry for the requested data is less than or equal to the current reference high water mark 630, indicating that the data has been successfully archived, then the requested data in the archive data store may be viewed 634. Otherwise, the requested data in the transactional data store is excluded from viewing because such data has not yet been successfully archived 632.

In some embodiments, a method includes: receiving a request to archive a set of data stored in a transactional data store; recording a high water mark in the transactional data store for the set of data; archiving the set of data, including copying the set of data into an archive data store and inserting a high water mark for the set of data in the transactional data store and the archive data store; updating a reference high water mark upon successful completion of operations for the archiving of the data, the reference high water mark representing completion of a last successful archive operation; and upon receiving a query for requested data contained in the transactional data store or the archive data store, determining whether to allow viewing of the requested data based at least in part on a current value of the reference high watermark.

In some embodiments, a system includes: a transactional data store including a first set of storage elements to store data; an archive data store including a first set of storage elements to store data; an archive engine to archive a set of data from the transactional data store to the archive data store in response to an archival request, the archive engine to copy the set of data into the archive data store and insert a high water mark for the set of data in the transactional data store and the archive data store, and update a reference high water mark upon successful completion of the archiving of the data, the reference high water mark representing completion of a last successful archive operation for the archive data store; and a transaction engine to implement data transactions in the transactional data store and an archive retrieval engine to retrieve data from the archive data store. In some embodiments, upon receiving a query for requested data contained in the transactional data store or the archive data store, the transaction engine or the archive retrieval engine are to determine whether to allow viewing of the requested data based at least in part on a current value of the reference high water mark.

In some embodiments, a non-transitory computer-readable storage medium has stored thereon data representing sequences of instructions that, when executed by a processor, cause the processor to perform operations including: receiving a request to archive a set of data stored in a first data store; recording a high water mark in the first data store for the set of data; archiving the set of data, including copying the set of data into a second data store and inserting a high water mark for the set of data in the first data store and the second data store; updating a reference high water mark upon successful completion of operations for the archiving of the data, the reference high water mark representing completion of a last successful archive operation; and upon receiving a query for requested data contained in the first or second data store, determining whether to allow viewing of the requested data based at least in part on a current value of the reference high water mark.

Figure 7:
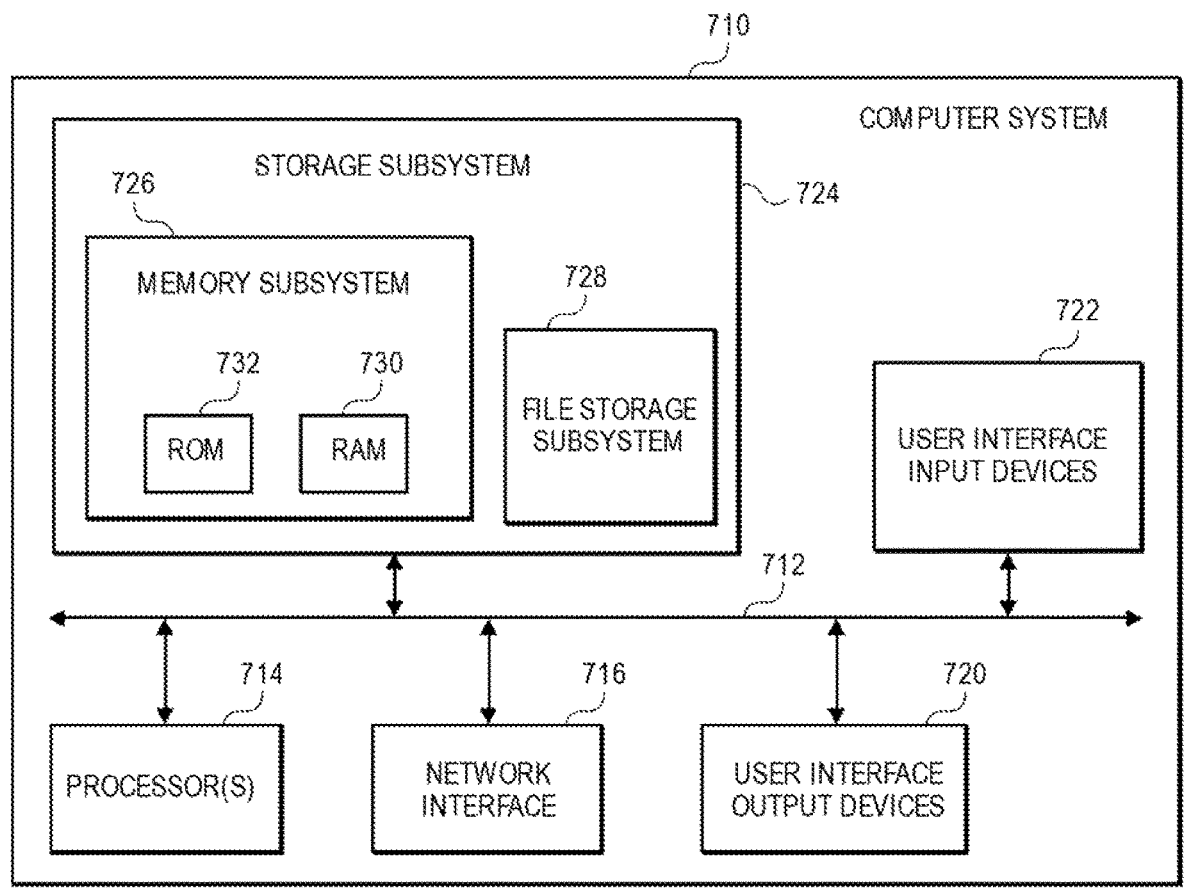
FIG. 7 is a block diagram to illustrate a computer system according to an embodiment.

FIG. 7 is a block diagram to illustrate a computer system according to an embodiment. FIG. 7 is a block diagram of an example computer system 710, according to one implementation. In some embodiments, the computer system 710 may be utilized in connection with the archival of data from a first data store (such as a transactional data store) to a second data store (such as an archive data store), including apparatuses, systems, and processes illustrated in FIGS. 1-6.

Computer system 710 typically includes at least one processor 714 that communicates with a number of peripheral devices via bus subsystem 712. The processor may be a general purpose central processing unit (CPU). The processor 714 may be an ASIC or RISC processor. The processor 714 an FPGA or other logic or gate array. The processor 714 can include graphic processing unit (GPU) resources. The peripheral devices may include a storage subsystem 724 including, for example, memory devices and a file storage subsystem, user interface input devices 722, user interface output devices 720, and a network interface subsystem 716. The input and output devices allow user interaction with computer system 710. Network interface subsystem 716 provides an interface to outside networks, including an interface to corresponding interface devices in other computer systems.

User interface input devices 722 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 710.

User interface output devices 720 may include a display subsystem, a printer, a fax machine, or non-visual displays such as audio output devices. The display subsystem may include a display panel device such as a liquid crystal display (LCD), a projection device, or some other mechanism for creating a visible image. The display subsystem may also provide a non-visual display such as audio output devices. In general, use of the term "output device" is intended to include all possible types of devices and ways to output information from computer system 710 to the user or to another machine or computer system.

Storage subsystem 724 stores programming and data constructs that provide the functionality of some or all of the modules and methods described herein. These software modules are generally executed by processor 714 alone or in combination with other processors.

Memory 726 used in the storage subsystem can include a number of memories including a main random access memory (RAM) 730 for storage of instructions and data during program execution and a read only memory (ROM) 732 in which fixed instructions are stored. A file storage subsystem 728 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 728 in the storage subsystem 724, or in other machines accessible by the processor.

Bus subsystem 712 provides a mechanism for letting the various components and subsystems of computer system 710 communicate with each other as intended. Although bus subsystem 712 is shown schematically as a single bus, alternative implementations of the bus subsystem may use multiple busses.

Computer system 710 can be of varying types including a workstation, server, computing cluster, blade server, server farm, or any other data processing system or computing device. Due to the ever-changing nature of computers and networks, the description of computer system 710 depicted in FIG. 7 is intended only as one example. Many other configurations of computer system 710 are possible having more or fewer components than the computer system depicted in FIG. 7.

In some embodiments, a non-transitory computer-readable storage medium having stored thereon data representing sequences of instructions that, when executed by a processor, cause the processor to perform operations including:

The examples illustrating the use of technology disclosed herein should not be taken as limiting or preferred. This example sufficiently illustrates the technology disclosed without being overly complicated. It is not intended to illustrate all of the technologies disclosed. A person having ordinary skill in the art will appreciate that there are many potential applications for one or more implementations of this disclosure and hence, the implementations disclosed herein are not intended to limit this disclosure in any fashion.

One or more implementations may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

Other implementations may include a non-transitory computer readable storage medium storing instructions executable by a processor to perform a method as described above. Yet another implementation may include a system including memory and one or more processors operable to execute instructions, stored in the memory, to perform a method as described above.

Figure 8:
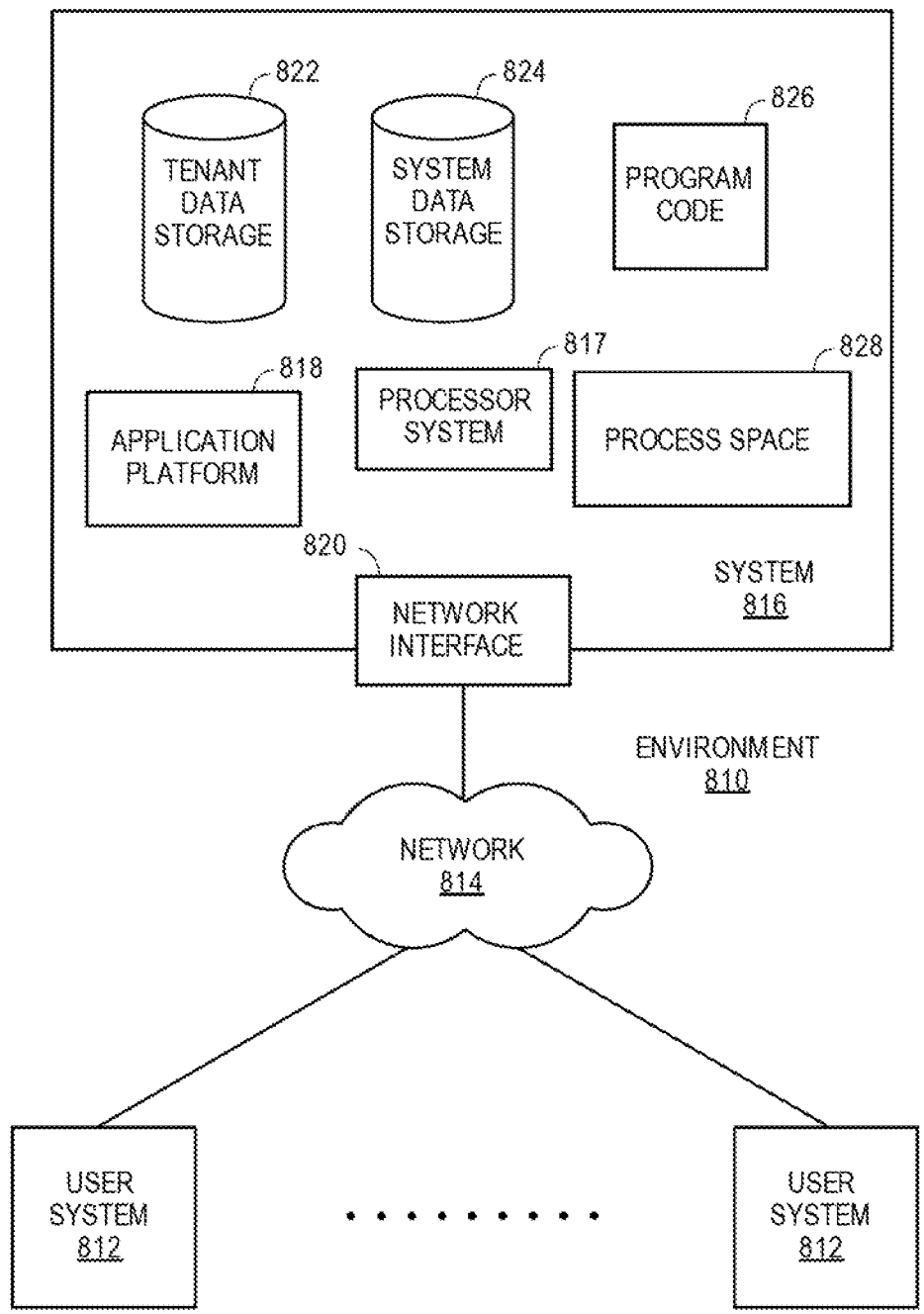
FIG. 8 illustrates a block diagram of an environment providing conditional selection of compound objects according to an embodiment.
Figure 9:
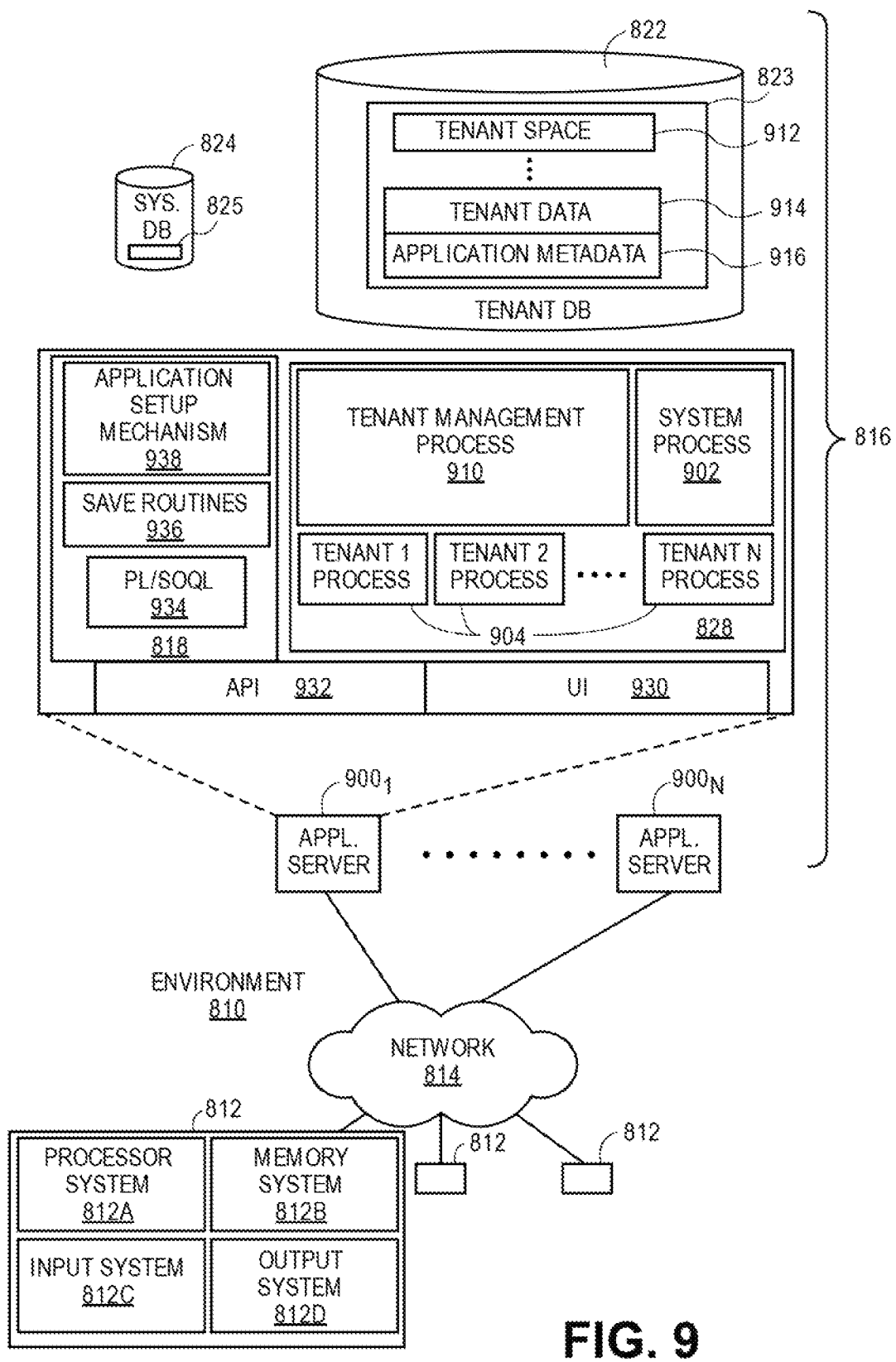
FIG. 9 illustrates details of an environment providing conditional selection of compound objects according to an embodiment.

FIG. 8 illustrates a block diagram of an environment providing conditional selection of compound objects according to an embodiment, and FIG. 9 illustrates details of an environment providing conditional selection of compound objects according to an embodiment. Components within an environment 810 may belong to different layers (e.g., compute, management) and may communicate as described above. Environment 810 may include user systems 812, network 814, system 816, processor system 817, application platform 818, network interface 820, tenant data storage 822, system data storage 824, program code 826, and process space 828. In other embodiments, environment 810 may not have all of the components listed and/or may have other elements instead of, or in addition to, those listed above.

Environment 810 is an environment in which an on-demand database service exists. User system 812 may be any machine or system that is used by a user to access a database user system. For example, any of user systems 812 can be a handheld computing device, a mobile phone, a laptop computer, a workstation, and/or a network of computing devices. As illustrated in FIG. 8, and in more detail in FIG. 9, user systems 812 might interact via a network 814 with an on-demand database service, which is system 816.

An on-demand database service, such as system 816, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 816" and "system 816" will be used interchangeably herein.

A database image may include one or more database objects. A relational database management system (RDMS) or the equivalent may execute storage and retrieval of information against the database object(s). Application platform 818 may be a framework that allows the applications of system 816 to run, such as the hardware and/or software, e.g., the operating system. In an embodiment, on-demand database service 816 may include an application platform 818 that enables creation, managing and executing one or more applications developed by the provider of the on-demand database service, users accessing the on-demand database service via user systems 812, or third party application developers accessing the on-demand database service via user systems 812.

The users of user systems 812 may differ in their respective capacities, and the capacity of a particular user system 812 might be entirely determined by permissions (permission levels) for the current user. For example, where a salesperson is using a particular user system 812 to interact with system 816, that user system has the capacities allotted to that salesperson. However, while an administrator is using that user system to interact with system 816, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level. Network 814 is any network or combination of networks of devices that communicate with one another. For example, network 814 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the Internet, that network will be used in many of the examples herein. However, it should be understood that the networks that are used in one or more implementations may not be so limited, although TCP/IP is a frequently implemented protocol.

User systems 812 might communicate with system 816 using TCP/IP and, at a higher network level, use other common Internet protocols to communicate, such as HTTP, FTP, AFS, WAP, etc. In an example where HTTP is used, user system 812 might include an HTTP client commonly referred to as a "browser" for sending and receiving HTTP messages to and from an HTTP server at system 816. Such an HTTP server might be implemented as the sole network interface between system 816 and network 814, but other techniques might be used as well or instead. In some implementations, the interface between system 816 and network 814 includes load-sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 816, shown in FIG. 8, implements a web-based customer relationship management (CRM) system. For example, in one embodiment, system 816 includes application servers configured to implement and execute CRM software applications as well as provide related data, code, forms, webpages and other information to and from user systems 812 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 816 implements applications other than, or in addition to, a CRM application. For example, system 816 may provide tenant access to multiple hosted (standard and custom) applications, including a CRM application. User (or third party developer) applications, which may or may not include CRM, may be supported by the application platform 818, which manages creation, storage of the applications into one or more database objects and executing of the applications in a virtual machine in the process space of the system 816.

One arrangement for elements of system 816 is shown in FIG. 8, including a network interface 820, application platform 818, tenant data storage 822 for tenant data 823, system data storage 824 for system data 825 accessible to system 816 and possibly multiple tenants, program code 826 for implementing various functions of system 816, and a process space 828 for executing MTS system processes and tenant-specific processes, such as running applications as part of an application hosting service. Additional processes that may execute on system 816 include database indexing processes.

Several elements in the system shown in FIG. 8 include conventional, well-known elements that are explained only briefly here. For example, each user system 812 could include a desktop personal computer, workstation, laptop or notebook, tablet computer, smart phone, cell phone, or any wireless access protocol (WAP) enabled device or any other computing device capable of interfacing directly or indirectly to the Internet or other network connection. User system 812 typically runs an HTTP client, e.g., a browsing program, such as Microsoft's Internet Explorer, Firefox, Chrome, or a mobile operating system browser in the case of a smart phone, cellular phone, or other wireless device, or the like, allowing a user (e.g., subscriber of the multi-tenant database system) of user system 812 to access, process and view information, pages and applications available to it from system 816 over network 814. Each user system 812 also typically includes one or more user interface devices, such as a keyboard, a mouse, trackball, touch pad, touch screen, pen, gesture recognition, or the like, for interacting with a graphical user interface (GUI) provided by the browser on a display (e.g., a monitor screen, LCD display, etc.) in conjunction with pages, forms, applications and other information provided by system 816 or other systems or servers. For example, the user interface device can be used to access data and applications hosted by system 816, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 812 and all of its components are operator configurable using applications, such as a browser, including computer code run using a central processing unit such as an Intel processor, including Celeron®, Pentium®, Core®, and Xeon® processors, or the like. Similarly, system 816 (and additional instances of an MTS, where more than one is present) and all of their components might be operator configurable using application(s) including computer code to run using a central processing unit such as processor system 817, which may include an Intel processor or the like, and/or multiple processor units.

A computer program product embodiment includes a machine-readable storage medium (media), including non-transitory computer-readable storage media, having instructions stored thereon/in which can be used to program a computer to perform any of the processes of the embodiments described herein. Computer code for operating and configuring system 816 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 816 is configured to provide webpages, forms, applications, data and media content to user (client) systems 812 to support the access by user systems 812 as tenants of system 816. As such, system 816 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 9 also illustrates environment 810. However, in FIG. 9 elements of system 816 and various interconnections in an embodiment are further illustrated. FIG. 9 shows that user system 812 may include processor system 812A, memory system 812B, input system 812C, and output system 812D. FIG. 9 shows network 814 and system 816. FIG. 9 also shows that system 816 may include tenant data storage 822, tenant data 823, system data storage 824, system data 825, User Interface (UI) 930, Application Program Interface (API) 932, PL/SQL 934, save routines 936, application setup mechanism 938, applications servers $900_1$-$900_N$, system process space 902, tenant process spaces 904, tenant management process space 910, tenant storage space 912, tenant data 914, and application metadata 916. In other embodiments, environment 810 may not have the same elements as those listed above and/or may have other elements instead of, or in addition to, those listed above.

User system 812, network 814, system 816, tenant data storage 822, and system data storage 824 were discussed above in FIG. 8. Regarding user system 812, processor system 812A may be any combination of one or more processors. Memory system 812B may be any combination of one or more memory devices, short term, and/or long term memory. Input system 812C may be any combination of input devices, such as one or more keyboards, mice, trackballs, scanners, cameras, and/or interfaces to networks. Output system 812D may be any combination of output devices, such as one or more monitors, printers, and/or interfaces to networks. As shown by FIG. 9, system 816 may include a network interface 820 (illustrated in FIG. 8) implemented as a set of HTTP application servers 900, an application platform 818, tenant data storage 822, and system data storage 824.

Also shown in FIG. 9 is system process space 902, including individual tenant process spaces 904 and a tenant management process space 910. Each application server 900 may be configured to tenant data storage 822 and the tenant data 823 therein, and system data storage 824 and the system data 825 therein to serve requests of user systems 812. The tenant data 823 might be divided into individual tenant storage spaces 912, which can be either a physical arrangement and/or a logical arrangement of data. Within each tenant storage space 912, tenant data 914 and application metadata 916 might be similarly allocated for each user. For example, a copy of a user's most recently used (MRU) items might be stored to tenant data 914. Similarly, a copy of MRU items for an entire organization that is a tenant might be stored to tenant storage space 912. A UI 930 provides a user interface and an API 932 provides an application programmer interface to system 816 resident processes to users and/or developers at user systems 812. The tenant data and the system data may be stored in various databases, such as one or more Oracle™ databases.

Application platform 818 includes an application setup mechanism 938 that supports application developers' creation and management of applications, which may be saved as metadata into tenant data storage 822 by save routines 936 for execution by subscribers as one or more tenant process spaces 904 managed by tenant management process 910 for example. Invocations to such applications may be coded using PL/SQL 934 that provides a programming language style interface extension to API 932. A detailed description of some PL/SQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 916 for the subscriber making the invocation and executing the metadata as an application in a virtual machine.

Each application server 900 may be communicably coupled to database systems, e.g., having access to system data 825 and tenant data 823, via a different network connection. For example, one application server $900_1$ might be coupled via the network 814 (e.g., the Internet), another application server 900N-1 might be coupled via a direct network link, and another application server 900N might be coupled by yet a different network connection. Transfer Control Protocol and Internet Protocol (TCP/IP) are typical protocols for communicating between application servers 900 and the database system. However, it will be apparent to one skilled in the art that other transport protocols may be used to optimize the system depending on the network interconnect used.

In certain embodiments, each application server 900 is configured to handle requests for any user associated with any organization that is a tenant. Because it is desirable to be able to add and remove application servers from the server pool at any time for any reason, there is preferably no server affinity for a user and/or organization to a specific application server 900. In one embodiment, therefore, an interface system implementing a load balancing function (e.g., an F5 Big-IP load balancer) is communicably coupled between the application servers 900 and the user systems 812 to distribute requests to the application servers 900. In one embodiment, the load balancer uses a least connections algorithm to route user requests to the application servers 900. Other examples of load balancing algorithms, such as round robin and observed response time, also can be used. For example, in certain embodiments, three consecutive requests from the same user could hit three different application servers 900, and three requests from different users could hit the same application server 900. In this manner, system 816 is multi-tenant, wherein system 816 handles storage of, and access to, different objects, data and applications across disparate users and organizations.

As an example of storage, one tenant might be a company that employs a sales force where each salesperson uses system 816 to manage their sales process. Thus, a user might maintain contact data, leads data, customer follow-up data, performance data, goals and progress data, etc., all applicable to that user's personal sales process (e.g., in tenant data storage 822). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 816 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 816 might also maintain system level data usable by multiple tenants or other data. Such system level data might include industry reports, news, postings, and the like that are sharable among tenants.

In certain embodiments, user systems 812 (which may be client systems) communicate with application servers 900 to request and update system-level and tenant-level data from system 816 that may require sending one or more queries to tenant data storage 822 and/or system data storage 824. System 816 (e.g., an application server 900 in system 816) automatically generates one or more SQL statements (e.g., one or more SQL queries) that are designed to access the desired information. System data storage 824 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. As indicated above, U.S. patent application Ser. No. 10/817,161, filed Apr. 2, 2004, now issued as U.S. Pat. No. 7,779,039, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

While concepts been described in terms of several embodiments, those skilled in the art will recognize that embodiments not limited to the embodiments described, but can be practiced with modification and alteration within the spirit and scope of the appended claims. The description is thus to be regarded as illustrative instead of limiting.

What is claimed is:

1. A method comprising:
   receiving a query from a user that requests access to a first data in a specified data store, the specified data store for the query being one of a first data store or a second data store, the second data store being an archive for the first data store, wherein the specified data store for the query includes a first data high water mark value associated with the first data, the first data high water mark indicating a time or order for a request to archive the first data, and wherein the first data store and the second data store each include a reference high water mark, the reference high water indicating a time or order for a last successful archive operation from the first data store to the second data store;
   in response to the query, comparing a current value of the first data high water mark in the specified data store to a current value of the reference high water mark for the specified data store; and
   determining whether to allow or deny viewing of the requested first data in the specified data store based at least in part on the comparison between the current value of the first data high water mark and the current value of the reference high water mark.

2. The method of claim 1, wherein determining whether to allow or deny viewing of the requested first data in the specified data store for the query includes:
   for a query directed to the first data store, denying the request if the current value of the first data water mark is less than or equal to the current value of the reference high water mark; and for a query directed to the second data store, denying the request if the current value of the first data high water mark is greater than the current value of the reference high water mark.

3. The method of claim 2, wherein determining whether to allow or deny viewing of the requested first data in the specified data store for the query further includes:
for a query directed to the first data store, allowing the request if a first data water mark has not been recorded for the requested first data.

4. The method of claim 1, further comprising rewriting the query for the requested first data to implement data viewing protection.

5. The method of claim 4, wherein rewriting the query includes inserting a reference to the current value of the reference high water mark in the query.

6. The method of claim 1, wherein a set of data that is to be archived from the first data store to the second data store is deleted asynchronously from the first data store subsequent to successful completion of the archive operation.

7. The method of claim 1, wherein the first data high water mark includes a date and time stamp for the first data.

8. The method of claim 1, wherein the first data high water mark includes an accession sequence number for the first data.

9. A system comprising:
a first data store including a first set of storage elements to store data and a second data store including a second set of storage elements to store data, wherein the second data store is an archive for the first data store, and wherein the first data store and the second data store each include a reference high water mark, the reference high water indicating a time or order for a last successful archive operation from the first data store to the second data store; and
one or more engines to retrieve data from the first data store and the second data store;
wherein, upon receiving a query from a user that requests access to a first data in a specified data store, the specified data store for the query being either the first data store or the second data store, the one or more engines are to:
compare a current value of the first data high water mark for the requested first data in the specified data store to a current value of the reference high water mark for the specified data store; and
determine whether to allow or deny viewing of the requested first data in the specified data store based at least in part on the comparison between the current value of the first data high water mark for the first data and the current value of the second reference high water mark.

10. The system of claim 9, wherein determining whether to allow or deny viewing of the requested first data in the specified data store for the query includes:
for a query directed to the first data store, denying the request if the current value of the first data water mark is less than or equal to the current value of the reference high water mark; and
for a query directed to the second data store, denying the request if the current value of the first data high water mark is greater than the current value of the reference high water mark.

11. The system of claim 10, wherein determining whether to allow viewing of the requested first data in the specified data store further includes:
for a query directed to the first data store, allowing the request if a first data water mark has not been recorded for the requested first data.

12. The system of claim 9, wherein the one or more engines are further to rewrite the query for the requested first data to implement data viewing protection.

13. The system of claim 12, wherein rewriting the query includes inserting a reference to the current value of the reference high water mark in the query.

14. The system of claim 9, wherein a set of data that is to be archived from the first data store to the second data store is deleted asynchronously from the first data store subsequent to successful completion of the archive operation.

15. The system of claim 9, wherein the system provides a consistent view of a set of data that is tolerant of intermittent failures during archive and delete operations.

16. A non-transitory computer-readable storage medium having stored thereon data representing sequences of instructions that, when executed by a processor, cause the processor to perform operations comprising:
receiving a query from a user that requests access to a first data in a specified data store, the specified data store for the query being one or a first data store or a second data store, the second data store being an archive for the first data store, wherein the specified data store for the query includes a first data high water mark associated with the first data, the first data high water mark indicating a time or order for a request to archive the first data, and wherein the first data store and the second data store each include a reference high water mark, the reference high water indicating a time or order for a last successful archive operation from the first data store to the second data store;
in response to the query, comparing a current value of the first data high water mark in the specified data store to a current value of the reference high water mark for the specified data store; and
determining whether to allow or deny viewing of the requested first data in the specified data store based at least in part on the comparison between the current value of the first data high water mark and the current value of the reference high water mark.

17. The storage medium of claim 16, and wherein determining whether to allow or deny viewing of the requested first data in the data store for the query includes:
for a query directed to the first data store, denying the request if the current value of the first data water mark is less than or equal to the current value of the reference high water mark; and
for a query directed to the second data store, denying the request if the current value of the first data high water mark is greater than the current value of the reference high water mark.

18. The storage medium of claim 17, wherein determining whether to allow or deny viewing of the requested data in the specified data store for the query further includes:
for a query directed to the first data store, allowing the request if a first data water mark has not been recorded for the requested first data.

19. The storage medium of claim 17, further comprising instructions that, when executed by the processor, cause the processor to perform operations comprising:
rewriting the query for the requested first data to implement data viewing protection.

20. The storage medium of claim 19, wherein rewriting the query includes inserting a reference to the current value of the reference high water mark in the query.

21. The method of claim 1, further comprising receiving a query from a user that requests access to a second data in the specified data store, wherein the specified data store includes a second data high water mark value associated with the second data, the second data high water mark indicating a time or order for a request to archive the second data.

22. The method of claim 21, wherein the second data high water mark is different than the first data high water mark.

* * * * *